US012522196B2

(12) United States Patent
Fisher

(10) Patent No.: US 12,522,196 B2
(45) Date of Patent: Jan. 13, 2026

(54) DRIVE CYCLE PREDICTION AND EFFICIENT CONTROL OF HYBRID ELECTRIC VEHICLES

(71) Applicant: FCA US LLC, Auburn Hills, MI (US)

(72) Inventor: Michael J Fisher, Plymouth, MI (US)

(73) Assignee: FCA US LLC, Auburn Hills, MI (US)

( * ) Notice: Subject to any disclaimer, the term of this patent is extended or adjusted under 35 U.S.C. 154(b) by 254 days.

(21) Appl. No.: 18/326,130

(22) Filed: May 31, 2023

(65) Prior Publication Data

US 2024/0400036 A1 Dec. 5, 2024

(51) Int. Cl.
*B60W 20/10* (2016.01)
*B60L 58/12* (2019.01)

(52) U.S. Cl.
CPC ............. *B60W 20/10* (2013.01); *B60L 58/12* (2019.02)

(58) Field of Classification Search
None
See application file for complete search history.

(56) References Cited

U.S. PATENT DOCUMENTS

| 8,167,066 | B2 | 5/2012 | Joos et al. |
| 9,227,626 | B2 | 1/2016 | Pandit et al. |
| 11,052,770 | B2 | 7/2021 | Grewal et al. |
| 2005/0228553 | A1* | 10/2005 | Tryon ................. B60L 50/16 701/22 |
| 2014/0297088 | A1* | 10/2014 | Ando .................. B60K 6/445 180/65.265 |
| 2017/0240064 | A1* | 8/2017 | Lee ..................... B60L 58/10 |
| 2017/0253139 | A1* | 9/2017 | North .................. B60L 58/12 |
| 2017/0282726 | A1* | 10/2017 | Ichikawa ............. B60L 53/50 |
| 2020/0102874 | A1* | 4/2020 | Kurtz ................. F02D 41/1441 |
| 2020/0117204 | A1* | 4/2020 | Lindemann ......... B60L 53/63 |

* cited by examiner

*Primary Examiner* — James J Lee
*Assistant Examiner* — Melanie G Huber
(74) *Attorney, Agent, or Firm* — Jeremy J. Klobucar

(57) ABSTRACT

Predictive control techniques for an electrified powertrain of a hybrid electric vehicle (HEV) include maintaining a database of past measured operational parameters of an electrified powertrain during a plurality of past drive cycles of the HEV, monitoring and comparing measured operational parameters of the electrified powertrain during a current drive cycle of the HEV to the past measured operational parameters of the electrified powertrain stored in the database, predicting or estimating operational parameters of the electrified powertrain for a remainder of the current drive cycle of the HEV based on the comparison, and controlling the electrified powertrain during the remainder of the current drive cycle of the HEV based on the predicted/estimated operational parameters of the electrified powertrain including at least controlling recharging of a high voltage (HV) battery system to increase a fuel economy or operational efficiency of the electrified powertrain.

10 Claims, 2 Drawing Sheets

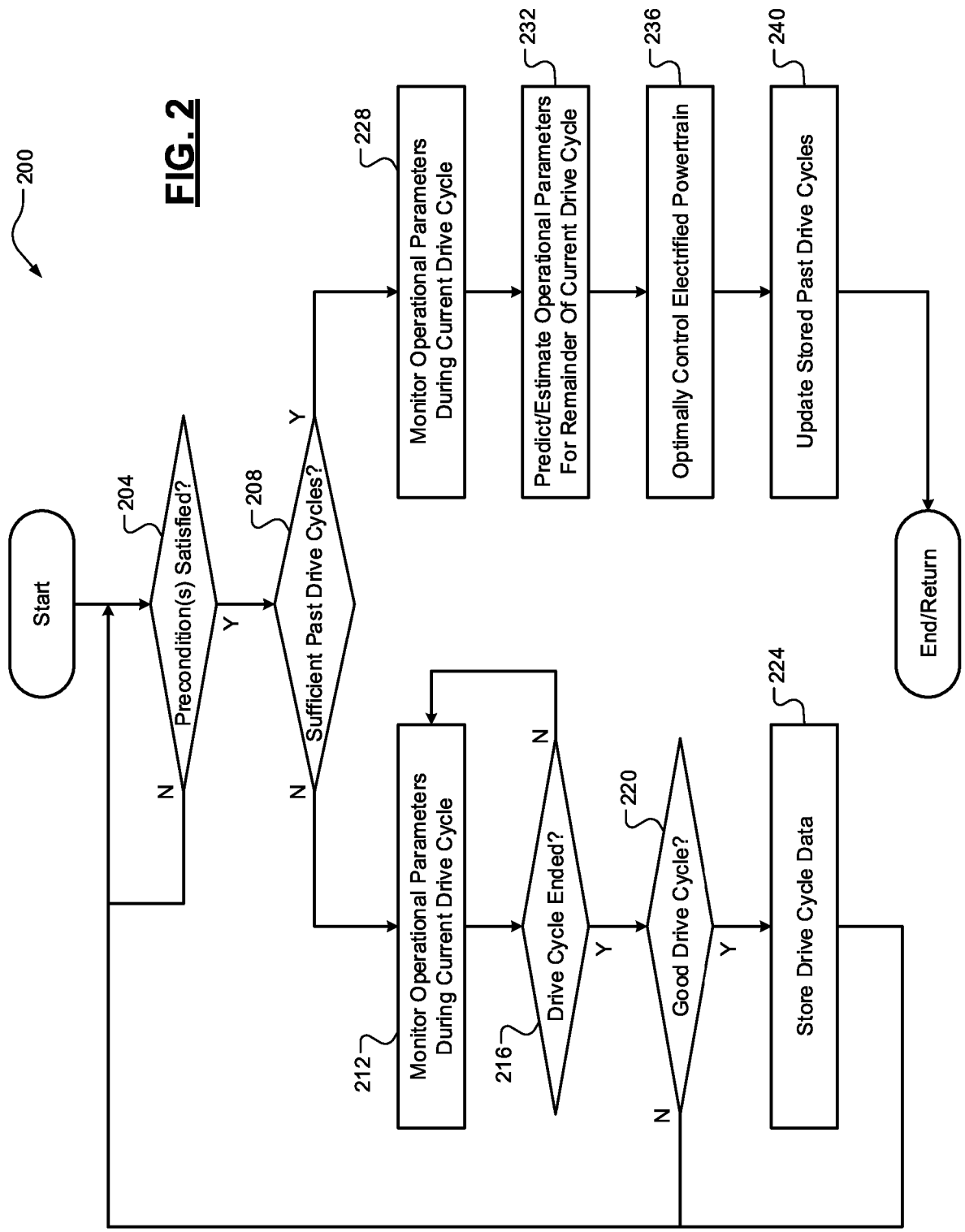

DRIVE CYCLE PREDICTION AND EFFICIENT CONTROL OF HYBRID ELECTRIC VEHICLES

FIELD

The present application generally relates to hybrid electric vehicles (HEVs) and, more particularly, to techniques for drive cycle prediction and efficient control of HEVs.

BACKGROUND

A hybrid electric vehicle (HEV) includes an electrified powertrain comprising at least one electric motor powered by a high voltage (HV) battery system and an engine powered by combustion of a mixture of air and fuel (gasoline, diesel, etc.). In one typical HEV configuration, the electric motor(s) is/are configured to generate propulsive drive torque and the engine is configured to generate electrical energy for recharging the HV battery system. Battery recharging during HEV operation is conventionally performed in a suboptimal, reactive manner based on sensor feedback, e.g., based a state of charge (SOC) of the HV battery system. For example, when the HV battery system's SOC is low and the engine is running, the driver may repeatedly tip-in and tip-out, thereby substantially varying a torque request. The engines in HEVs, however, are typically small and not particularly powerful. Accordingly, while such conventional HEV electrified powertrain control systems do work for their intended purpose, there exists an opportunity for improvement in the relevant art.

SUMMARY

According to one example aspect of the invention, a predictive control system for an electrified powertrain of a hybrid electric vehicle (HEV) is presented. In one exemplary implementation, the predictive control system comprises a set of sensors configured to measure operational parameters of the electrified powertrain during each of a plurality of past drive cycles of the HEV, the electrified powertrain including at least one electric motor powered by a high voltage (HV) battery system and an engine, and a controller configured to maintain a database of past measured operational parameters of the electrified powertrain during the plurality of past drive cycles of the HEV, monitor measured operational parameters of the electrified powertrain during a current drive cycle of the HEV, compare the measured operational parameters of the electrified powertrain during the current drive cycle to the past measured operational parameters of the electrified powertrain stored in the database, predict or estimate operational parameters of the electrified powertrain for a remainder of the current drive cycle of the HEV based on the comparison, and control the electrified powertrain during the remainder of the current drive cycle of the HEV based on the predicted/estimated operational parameters of the electrified powertrain, wherein the controlling of the electrified powertrain includes at least controlling recharging of the HV battery system to increase a fuel economy or operational efficiency of the electrified powertrain.

In some implementations, the predicted or estimated operational parameters for the remainder of the current drive cycle indicate an upcoming charging session of the electrified vehicle, and wherein the controller is configured to control the electrified powertrain such that the engine remains off and the electric motor depletes the HV battery system further than a low state of charge (SOC) threshold where the engine is normally turned on. In some implementations, wherein the operational parameters include a temperature of an exhaust treatment system catalyst. In some implementations, the controlling of the electrified powertrain during the current drive cycle includes periodically controlling the engine such that exhaust gas produced by the engine maintains the temperature of the exhaust treatment system catalyst at or above a minimum temperature threshold. In some implementations, periodically controlling the engine to maintain the temperature of the exhaust treatment system catalyst at or above the minimum temperature threshold decreases emissions of the HEV.

In some implementations, controlling the electrified powertrain during the current drive cycle includes controlling the engine to generate electrical energy to recharge the HV battery system to maintain an SOC of the HV battery system remains at or above a minimum SOC threshold. In some implementations, controlling the engine to maintain the SOC of the HV battery system at or above the minimum SOC at least one of increases performance and fuel economy of the HEV. In some implementations, the plurality of past trips equals a calibrated number of previous trips. In some implementations, the calibrated number of previous trips is 30. In some implementations, each of the calibrated number of previous trips satisfies a desired criteria such that the operational parameters during each previous trip are sufficiently determinable.

According to another example aspect of the invention, a predictive control method for an electrified powertrain of an HEV is presented. In one exemplary implementation, the method comprises obtaining, by a controller and from a set of sensors, measured operational parameters of the electrified powertrain during each of a plurality of past drive cycles of the HEV, the electrified powertrain including at least one electric motor powered by an HV battery system and an engine, maintaining, by the controller, a database of past measured operational parameters of the electrified powertrain during the plurality of past drive cycles of the HEV, monitoring, by the controller, measured operational parameters of the electrified powertrain during a current drive cycle of the HEV, comparing, by the controller, the measured operational parameters of the electrified powertrain during the current drive cycle to the past measured operational parameters of the electrified powertrain stored in the database, predicting or estimating, by the controller, operational parameters of the electrified powertrain for a remainder of the current drive cycle of the HEV based on the comparison, and controlling, by the controller, the electrified powertrain during the remainder of the current drive cycle of the HEV based on the predicted/estimated operational parameters of the electrified powertrain, wherein the controlling of the electrified powertrain includes at least controlling recharging of the HV battery system to increase a fuel economy or operational efficiency of the electrified powertrain.

In some implementations, the predicted or estimated operational parameters for the remainder of the current drive cycle indicate an upcoming charging session of the electrified vehicle, and wherein the controller is configured to control the electrified powertrain such that the engine remains off and the electric motor depletes the HV battery system further than a low SOC threshold where the engine is normally turned on. In some implementations, the operational parameters include a temperature of an exhaust treatment system catalyst. In some implementations, the controlling of the electrified powertrain during the current drive cycle includes periodically controlling the engine such that exhaust gas produced by the engine maintains the temperature of the exhaust treatment system catalyst at or above a minimum temperature threshold. In some implementations, periodically controlling the engine to maintain the temperature of the exhaust treatment system catalyst at or above the minimum temperature threshold decreases emissions of the HEV.

In some implementations, controlling the electrified powertrain during the current drive cycle includes controlling the engine to generate electrical energy to recharge the HV battery system to maintain an SOC of the HV battery system remains at or above a minimum SOC threshold. In some implementations, controlling the engine to maintain the SOC of the HV battery system at or above the minimum SOC at least one of increases performance and fuel economy of the HEV. In some implementations, the plurality of past trips equals a calibrated number of previous trips. In some implementations, the calibrated number of previous trips is 30. In some implementations, each of the calibrated number of previous trips satisfies a desired criteria such that the operational parameters during each previous trip are sufficiently determinable.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

BRIEF DESCRIPTION OF THE DRAWINGS

FIG. 2 is a flow diagram of an example predictive drive cycle-based control method for an electrified powertrain of an HEV according to the principles of the present application.

DESCRIPTION

Figure 1:
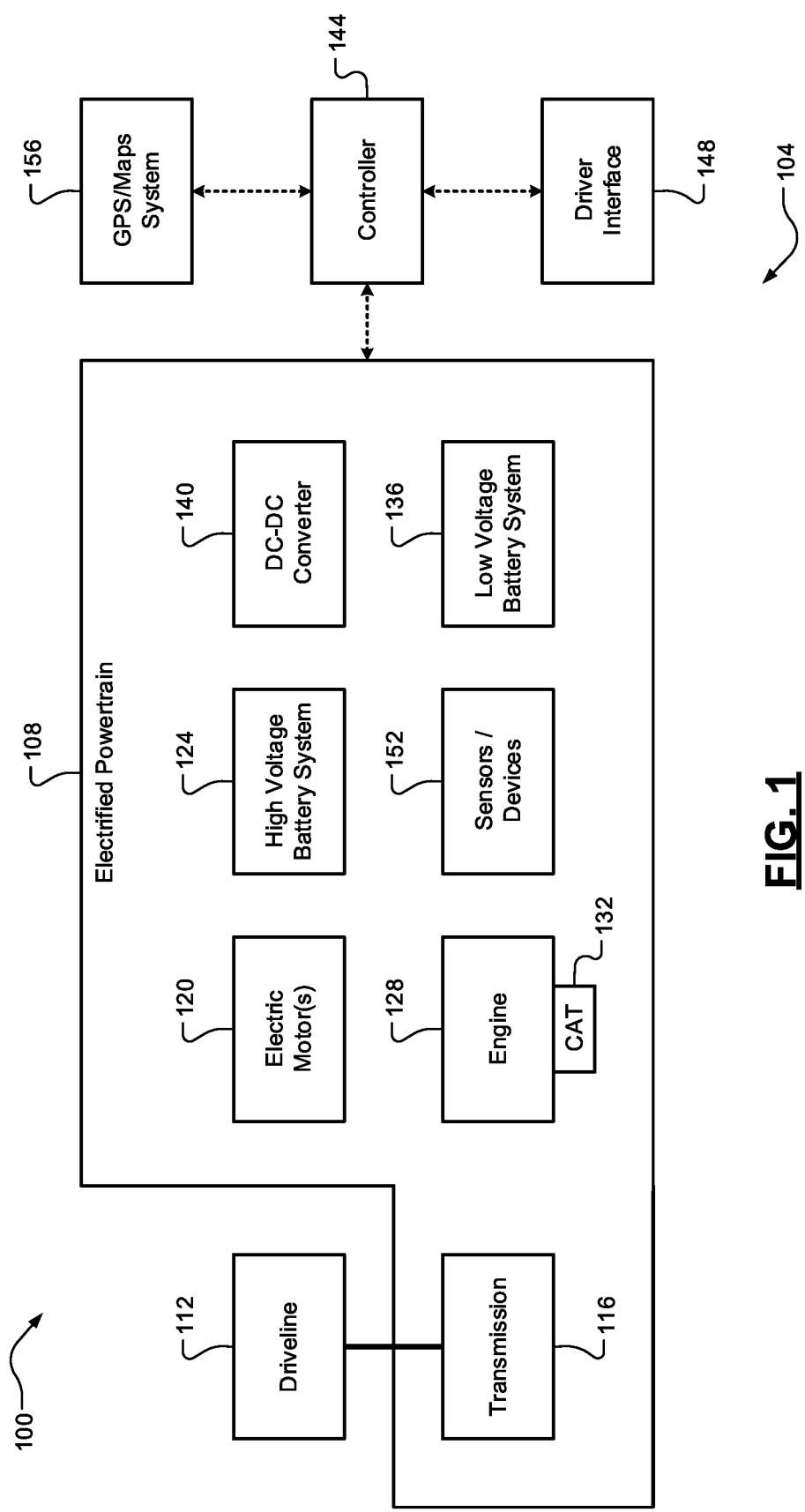
FIG. 1 is a functional block diagram of a hybrid electric vehicle (HEV) having an example predictive control system for an electrified powertrain according to the principles of the present application.

As previously discussed, battery recharging during hybrid electric vehicle (HEV) operation is conventionally performed in a suboptimal, reactive manner based on sensor feedback, e.g., based a state of charge (SOC) of a high voltage (HV) battery system. Thus, there exists an opportunity for improvement in the relevant art. Accordingly, techniques that monitor a plurality of past drive cycles of an HEV to predict aspects of a future drive cycle and to optimally control an electrified powertrain of the HEV during the future drive cycle. A calibratable number (e.g., 30) of most recent HEV drive cycles could be stored and a routine (e.g., most-likely) drive cycle could be determined therefrom. This could include, for example, time of day, global positioning satellite (GPS) system (vehicle location) data, traffic conditions, vehicle speed, and the like. For example, the HEV could traverse a same, relatively steady-state drive cycle to/from the driver's place of work twice per day. All or a remaining portion of a current (future) drive cycle could then be estimated/predicted and the electrified powertrain can be optimally controlled to increase fuel economy and/or operating efficiency of the HEV. This could include controlling time(s) to recharge the HV battery system and/or controlling the engine to maintain an exhaust system catalyst at or above a minimum temperature threshold for improved emissions performance.

Referring now to FIG. 1, a functional block diagram of an HEV including a predictive control system 104 for an electrified powertrain 108 according to some implementations of the present application is illustrated. The electrified powertrain 108 is configured to generate drive torque that is transferred to a driveline 112 via a transmission 116, such as a multi-speed automatic transmission. The electrified powertrain 108 includes one or more electric motors 120 (e.g., electric traction motors) configured to generate drive torque using electrical energy provided by an HV battery system 124. The electrified powertrain 108 also includes an internal combustion engine 128 configured to combust a mixture of air and fuel (diesel, gasoline, etc.) to generate drive torque. While the drive torque could be used for vehicle propulsion, in most HEV applications the engine is configured to generate electrical energy for battery system recharging. The engine 128 could be coupled to an electrical generator device (not shown) that converts its rotational drive torque to an alternating current (AC), which could then be converted to direct current (DC) by an AC-DC converter (not shown) for recharging the HV battery system 124.

Exhaust gas resulting from combustion of the air/fuel mixture within the engine 128 is expelled therefrom and treated by an exhaust treatment system (not shown) that includes a catalyst (CAT) 132, such as a three-way catalytic converter. The catalyst 132 is configured to mitigate or eliminate emissions in the exhaust gas before its release into the atmosphere. The catalyst 132 requires at least a minimum temperature threshold to be able to achieve its desired or optimal conversion efficiency, which is also known as a catalyst light-off temperature. Operating the engine 128 while the catalyst 132 is less than this minimum operating temperature for extended periods of time could increase emissions. Thus, cold start techniques are typically utilized to quickly warm the catalyst 132 to at least this minimum temperature threshold. The electrified powertrain 108 further includes a low voltage (e.g., 12 volt) battery system 136 configured to power low voltage accessory components (not shown) of the HEV 100 (pumps, switches, in-cabin electronics, heating/ventilation/air conditioning (HVAC), etc.). A DC-DC converter 140 is configured to step up/down DC voltages for desired purposes, such as decreasing the DC voltage of the HV battery system 124 to a lower DC voltage for recharging the LV battery system 136 and vice-versa.

A controller 144 is configured to control operation of the HEV 100 and, more particularly, the electrified powertrain 108. In general, the controller 144 receives a torque request from a driver via a driver interface 148 (e.g., an accelerator pedal) and controls the electrified powertrain 108 to generate an amount of drive torque to satisfy the driver torque request. The controller 144 monitors operational parameters of the electrified powertrain 108 (or the HEV 100) using a set of sensors/devices 152. Non-limiting examples of the sensors/devices 152 include temperature sensors, speed sensors, time sensors, a global navigation satellite system (GNSS) transceiver, and a memory. The GNSS transceiver could communicate with a GPS/maps system to obtain location data and maps data for localization of the HEV 100. The memory (e.g., non-volatile memory, or NVM) could store data for a plurality of past trips or drive cycles of the HEV 100. The term "drive cycle" as used herein refers to a period from when the HEV 100 is started (turned on) until it is subsequently stopped and powered off. The number of past drive cycles for which data is stored/maintained could be calibratable by a maker of the HEV 100 or the driver himself/herself. The operational parameters for each past trip include various speeds/temperatures/routes and the like. In other words, these operational parameters could include any suitable information that could be leveraged to determine optimal control of the electrified powertrain 108 during a subsequent/future drive cycle.

In addition to recharging the HV battery system 124 and warming the catalyst 132, the engine 128 could also be started for a plurality of other reasons. Non-limiting examples of other situations in which the engine 128 could be started include a driver torque request corresponding to maximum performance (e.g., wide-open throttle, or WOT), excessive low voltage accessory loads (e.g., heavy operation of the HVAC or climate control system). For example only, certain government emissions regulations could be defined by vehicle speed versus time and thus the HEV's emissions must be closely monitored throughout each drive cycle. Learning that occurs during these past drive cycles (storage of past drive cycles) could be limited to real-world driving conditions that are considered normal HEV operation and not extended outside of these conditions. By leveraging all of the above-described data, the controller 144 knows when certain operational conditions are expected to occur (e.g., whether the engine is on/off) and how much time is expected to remain on the current drive cycle. The controller 144 can thereby leverage all of this known data to proactively, optimally control the electrified powertrain 108, e.g., for recharging of the HV battery system 124 and/or for warming of the catalyst 132.

Another key aspect of the predictive control techniques of the present application is predicting or estimating that a charging session of the HEV (e.g., a plug-in charging session) is upcoming. In such an event, the predictive control techniques are able to deplete the SOC of the HV battery system 124 to a lower level than is typically allowed (e.g., 20%). For example, the SOC of the HV battery system 124 could be depleted all the way down to a few percent when there is a very high likelihood of a charging session about to occur. As previously discussed herein, in the example scenario where the driver commutes daily to/from a workplace, each of these trips or drive cycles could be immediately followed by a charging session. Thus, when one of these drive cycles is predicted, the HV battery system 124 could be further depleted to some lower SOC threshold (e.g., 2%). This allows the electrified vehicle 100 to not start the engine 124 for battery system recharging, thereby saving fuel and increasing fuel economy of the electrified vehicle 100.

Referring now to FIG. 2, a flow diagram of an example predictive drive cycle-based control method 200 for an electrified powertrain of an HEV according to the principles of the present application is illustrated. While the HEV 100 and its components are specifically referenced for illustrative/descriptive purposes, it will be appreciated that the method 200 could be applicable to any suitable HEV. At optional 204, the controller 144 determines whether a set of one or more preconditions are satisfied. This could include, for example only, there being no malfunctions or faults present that would otherwise affect or inhibit operation of the HEV 100. When false, the method 200 ends or returns to 204. When true, the method 200 continues and proceeds to 208. At 208, the controller 204 determines whether a calibrated number of previous drive cycles have been monitored and stored. When true, the method 200 proceeds to 228 (i.e., a post-learning process). When false, the method 200 proceeds to 212 (i.e., the learning process). At 212, the controller 144 monitors operational parameters (e.g., from sensors/devices 152) during a current drive cycle.

At 216, the controller 204 determines whether the current drive cycle has ended. When false, the method 200 returns to 212. When true, the method 200 proceeds to 220. At 220, the controller 144 determines whether the past drive cycle satisfied desired criteria (e.g., sufficient length and collected data to constitute a usable past drive cycle). When true, the method 200 proceeds to 224 where the controller 144 stores the drive cycle and the method 200 returns to 204. Otherwise, the past drive cycle is not stored or otherwise accounted for and the method 200 returns to 204.

Once the calibrated number of past drive cycles are experienced and stored, the method 200 will be able to proceed from 208 to 228 (i.e., the post-learning process). At 228, the controller 144 monitors operational parameters (e.g., from sensors/devices 152) during a current drive cycle. At 232, the controller 144 predicts or estimates operational parameters for the remainder of the current (future) drive cycle based on the stored past drive cycles. This could include, for example only, determining a routine drive cycle (e.g., a most-likely or most-experienced past drive cycle). This could also include other matching techniques to determine which of the past drive cycles most-closely corresponds to the current drive cycle. For example, a weighted-average of closely matched past drive cycles could be utilized to predict/estimate the operational parameters for the current drive cycle. This could also be performed periodically (e.g., at set time intervals) throughout the current drive cycle until sufficient matching occurs.

At 236, based on the predicted/estimated operational parameters, the controller 144 optimally controls the electrified powertrain 108 during the remainder of the current drive cycle to increase fuel economy and/or efficiency of the HEV 100. As previously discussed, this could include at least one of controlling recharging of the HV battery system 124 via the engine 128 and controlling warming of the catalyst 132 via the engine 128. At optional 240, the controller 144 could update the past drive cycle stored data to include this most-recent drive cycle. The method 300 then ends or returns to 204 for one or more additional method cycles.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A predictive control system for an electrified powertrain of a hybrid electric vehicle (HEV), the predictive control system comprising:
a set of sensors configured to measure operational parameters of the electrified powertrain during each of a plurality of past drive cycles of the HEV, the electrified powertrain including at least one electric motor powered by a high voltage (HV) battery system and an engine, wherein the operational parameters include at least a state of charge (SOC) of the HV battery system and a temperature of an exhaust treatment system catalyst; and
a controller configured to:
maintain a database of past measured operational parameters of the electrified powertrain during the plurality of past drive cycles of the HEV;
monitor measured operational parameters of the electrified powertrain during a current drive cycle of the HEV;
compare the measured operational parameters of the electrified powertrain during the current drive cycle to the past measured operational parameters of the electrified powertrain stored in the database;
predict or estimate operational parameters of the electrified powertrain for a remainder of the current drive cycle of the HEV based on the comparison; and
control the electrified powertrain during the remainder of the current drive cycle of the HEV based on the predicted/estimated operational parameters of the electrified powertrain,
wherein the controlling of the electrified powertrain during the remainder of the current drive cycle includes at least controlling recharging of the HV battery system to increase a fuel economy or operational efficiency of the electrified powertrain, and
wherein the controlling of the electrified powertrain during the remainder of the current drive cycle includes at least monitoring the SOC of the HV battery system relative to a minimum SOC threshold and the temperature of the exhaust treatment system catalyst relative to a light-off temperature threshold to ensure that the engine can be started to recharge the HV battery system when the SOC of the HV battery system falls to the minimum SOC threshold without the temperature of the exhaust treatment system catalyst falling below the light-off temperature threshold thereby increasing vehicle emissions.

2. The predictive control system of claim 1, wherein the predicted or estimated operational parameters for the remainder of the current drive cycle indicate an upcoming charging session of the electrified vehicle, and wherein the controller is configured to control the electrified powertrain such that the engine remains off and the electric motor depletes the HV battery system further than the minimum SOC threshold where the engine is normally turned on.

3. The predictive control system of claim 1, wherein the plurality of past trips equals a calibrated number of previous trips.

4. The predictive control system of claim 3, wherein the calibrated number of previous trips is 30.

5. The predictive control system of claim 3, wherein each of the calibrated number of previous trips satisfies a desired criteria such that the operational parameters during each previous trip are sufficiently determinable.

6. A predictive control method for an electrified powertrain of a hybrid electric vehicle (HEV), the method comprising:
obtaining, by a controller and from a set of sensors, measured operational parameters of the electrified powertrain during each of a plurality of past drive cycles of the HEV, the electrified powertrain including at least one electric motor powered by a high voltage (HV) battery system and an engine, wherein the operational parameters include at least a state of charge (SOC) of the HV battery system and a temperature of an exhaust treatment system catalyst;
maintaining, by the controller, a database of past measured operational parameters of the electrified powertrain during the plurality of past drive cycles of the HEV;
monitoring, by the controller, measured operational parameters of the electrified powertrain during a current drive cycle of the HEV;
comparing, by the controller, the measured operational parameters of the electrified powertrain during the current drive cycle to the past measured operational parameters of the electrified powertrain stored in the database;
predicting or estimating, by the controller, operational parameters of the electrified powertrain for a remainder of the current drive cycle of the HEV based on the comparison; and
controlling, by the controller, the electrified powertrain during the remainder of the current drive cycle of the HEV based on the predicted/estimated operational parameters of the electrified powertrain,
wherein the controlling of the electrified powertrain during the remainder of the current drive cycle includes at least controlling recharging of the HV battery system to increase a fuel economy or operational efficiency of the electrified powertrain, and
wherein the controlling of the electrified powertrain during the remainder of the current drive cycle includes at least monitoring the SOC of the HV battery system relative to a minimum SOC threshold and the temperature of the exhaust treatment system catalyst relative to a light-off temperature threshold to ensure that the engine can be started to recharge the HV battery system when the SOC of the HV battery system falls to the minimum SOC threshold without the temperature of the exhaust treatment system catalyst falling below the light-off temperature threshold thereby increasing vehicle emissions.

7. The method of claim 6, wherein the predicted or estimated operational parameters for the remainder of the current drive cycle indicate an upcoming charging session of the electrified vehicle, and wherein the controller is configured to control the electrified powertrain such that the engine remains off and the electric motor depletes the HV battery system further than the minimum SOC threshold where the engine is normally turned on.

8. The method of claim 6, wherein the plurality of past trips equals a calibrated number of previous trips.

9. The method of claim 8, wherein the calibrated number of previous trips is 30.

10. The method of claim 8, wherein each of the calibrated number of previous trips satisfies a desired criteria such that the operational parameters during each previous trip are sufficiently determinable.

* * * * *